United States Patent [19] [11] 4,248,636
Sasaki et al. [45] Feb. 3, 1981

[54] INK FOR INK-JET PRINTER CONTAINING DICHLOROMETHANE AS AN ORGANIC SOLVENT AND A BASIC DYE AS A COLORING AGENT

[75] Inventors: Ryusei Sasaki; Yasuki Mori; Hirosada Morishita, all of Hitachi, Japan

[73] Assignee: Hitachi, Ltd., Japan

[21] Appl. No.: 17,896

[22] Filed: Mar. 6, 1979

Related U.S. Application Data

[63] Continuation-in-part of Ser. No. 822,263, Aug. 5, 1977, abandoned.

[30] Foreign Application Priority Data

Aug. 9, 1976 [JP] Japan ................................ 51/93988

[51] Int. Cl.³ ..................... C09D 11/08; C09D 11/10; C09D 11/14
[52] U.S. Cl. ........................................ 106/23; 106/22; 106/26; 106/30; 106/193 P; 260/37 EP; 260/38; 260/40 R; 260/42.21; 260/42.32; 260/DIG. 38; 427/14.1; 427/26
[58] Field of Search ................. 106/22, 193 P, 23, 26, 106/30; 260/37 EP

[56] References Cited

U.S. PATENT DOCUMENTS

| | | | |
|---|---|---|---|
| 3,314,907 | 4/1967 | Fronczak | 106/277 |
| 3,425,779 | 2/1969 | Fisher et al. | 106/22 |
| 3,476,853 | 11/1969 | Jatul | 424/45 |
| 3,926,645 | 12/1975 | Strahl | 106/21 |
| 3,948,668 | 4/1976 | Hayek et al. | 106/22 |
| 4,083,680 | 4/1978 | Psaar | 8/2.5 A |
| 4,087,241 | 5/1978 | Psaar | 8/2.5 A |
| 4,106,027 | 8/1978 | Hoffmann et al. | 106/22 |
| 4,136,076 | 1/1979 | Daniels | 106/22 |
| 4,153,467 | 5/1979 | Yano et al. | 106/23 |

FOREIGN PATENT DOCUMENTS

| | | | |
|---|---|---|---|
| 1206534 | 9/1970 | United Kingdom | 106/22 |
| 444800 | 5/1975 | U.S.S.R. | 106/22 |

Primary Examiner—Edward M. Woodberry
Attorney, Agent, or Firm—Craig & Antonelli

[57] ABSTRACT

An ink for an ink-jet printer having a specific resistance of 1 kΩ-cm or less and comprising (1) as an organic solvent in a vehicle (a) dichloromethane or (b) a mixed solvent of dichloromethane and at least one member selected from halogenated lower alkanes except for dichloromethane and halogenated lower alkenes and (2) as a coloring agent (a) a basic dye or (b) a mixture of a basic dye and at least one selected from oil-soluble dyes and organic pigments can ink-jet print letters. symbols, etc. on a hydrophobic substrate.

23 Claims, No Drawings

4,248,636

INK FOR INK-JET PRINTER CONTAINING DICHLOROMETHANE AS AN ORGANIC SOLVENT AND A BASIC DYE AS A COLORING AGENT

CROSS-REFERENCE TO RELATED APPLICATIONS

This application is a continuation-in-part of Application Ser. No. 822,263 filed Aug. 5, 1977 and now abandoned.

BACKGROUND OF THE INVENTION

1. Field of the Invention

The present invention relates to an ink for an ink-jet printer.

2. Description of the Prior Art

An ink-jet printing process has attracted intense interest recently for printing letters or symbols on the surface of mass-produced industrial products or packed boxes, etc.

The ink-jet printing process has heretofore been used in terminal printing of an electronic computer, etc., but the substrate has been paper. Therefore, water-soluble inks have been used in the process (U.S. Pat. No. 3,687,887).

According to the ink-jet printing method, an ink sent from a storage tank by the action of compressed air, etc. enters an ink-jet apparatus having an orifice of 20 to 150 μm in diameter, where the ink is converted into a continuous flow of fine particles by the action of a vibrator operated magnetically or electrically. In the course from said jet apparatus to a printing substrate, the flow of fine particles is controlled by a video signal from an electronic character generator and an electrostatic deflection system and prints letters and symbols continuously on the printing substrate.

In the above-mentioned process, the ink particles must always be fine particles of a definite size and must respond sensitively to the action of said control system in order to keep the uniform density of the printed letters and symbols. Therefore, the properties such as viscosity, surface tension, specific gravity, electroconductivity, etc. of the ink are strictly controlled according to the shape, size and material of the nozzle and applied voltage, etc. Since prior art inks are printed on paper as described above, however, proposals on improvement in the process have exclusively been directed to water-soluble inks.

SUMMARY OF THE INVENTION

Therefore, an object of the present invention is to provide a novel ink for an ink-jet printer which can print on a hydrophobic substrate such as plastic, glass, metal, etc. according to an ink-jet printing process.

Another object of the invention is to provide a fireproof ink required for the ink-jet printing process.

The other objects and advantages of the present invention will be apparent from the following description.

According to the present invention, there is provided an ink for an ink-jet printer comprising a vehicle and a coloring agent and having a sepcific resistance of 1 kΩ-cm or less wherein (1) a substantially anhydrous organic solvent in the vehicle comprises 100 parts by weight of
  (a) dichloromethane or
  (b) a mixed solvent obtained by replacing a part of dichloromethane by at least one member selected from the group consisting of halogenated lower alkanes except for dichloromethane and halogenated lower alkenes and
(2) the coloring agent comprises 0.2 part by weight or more, preferably 0.5 to 6 parts by weight, of
  (a) a basic dye or
  (b) a mixture obtained by replacing a part of a basic dye by at least one member selected from the group consisting of oil-soluble dyes and organic pigments which is soluble in the solvent as shown in (1) above.

DETAILED DESCRIPTION OF THE INVENTION

The desired ink for an ink-jet printer must also be applicable to prior art ink-jet printing processes and must be able to print rapidly on not only ink-absorbent substrates such as paper but also hydrophobic and nonabsorbent substrates such as plastics, metals, etc. It is particularly desirable therefor that the ink has a specific resistance of 1 kΩ-cm or less, a viscosity of 5 centipoises or less at room temperature, a surface tension of 25 dyne/cm or more, a specific gravity of 0.9 to 1.3, etc. Also, it is required for said ink to be excellent in adhesive property, drying property, water proofness and particularly flame proofness as compared with prior art aqueous inks for paper. The reason therefor is that a DC voltage of about 100 to 7,000 V is applied in the ink-jet printing process owing to the charge of ink particles and the deflection of the ink. Even if discharge occurs in the case owing to dust in the air, the ink must not catch fire. Also, it must be avoided that printed letters or symbols become illegible or contaminate the other articles owing to poor dryness of the ink when the printed surface is rubbed after printing. Further, it must be absolutely avoided that a coloring agent or vehicle components separate as crystals, since an orifice of 20 to 150 μm in diameter provided on the flow path for the ink in the ink-jet printer is clogged thereby. In order to satisfy the above-mentioned requisites, the following components of an ink for an ink-jet printer have been selected:

(1) As an organic solvent component in the vehicle,
  (a) dichloromethane
  or
  (b) a mixture of dichloromethane and at least one member selected from halogenated lower alkanes except for dichloromethane and halogenated lower alkenes
(2) As a coloring material,
  (a) a basic dye
  or
  (b) a mixture of a basic dye and at least one member selected from oil-soluble dyes and organic pigments.

The present invention is characterized by this selection of the components.

The solvent in said vehicle plays an important part in the present invention in that it dissolves the vehicle solid component (or a so-called binder) and said coloring agent, provides the ink with flame resistance and controls the drying velocity of the ink. As such a solvent, dichloromethane is most suitable. Further, according to the drying velocity, at least one member selected from the group consisting of trichlorofluoromethane, 1,1,1-trichloroethane, 1,1,2-trichloro-1,2,2-trifluoroethane, 1,1,2,2-tetrachloro-1,2-difluoroethane, trichloroethylene, tetrachloroethylene, α-bromopropane, etc. may be used in admixture with dichloromethane. The proportion of dichloromethane in the mixed solvent system in preferably 20% by weight or more. In order to maintain the specific resistance stably and to prevent the mixed solvent from instability due to vaporization, more preferable proportion of dichloromethane in the mixed solvent is 30–60% by weight. If the proportion of dichloromethane is less than 20% by weight, the dissolving power of the mixed solvent for the vehicle and the coloring agent and the electroconductivity of the ink become unsatisfactory.

In the present invention, a basic dye is an important component for controlling the electroconductivity of the ink together with said solvent and is also a coloring material (or agent) and resistance controller. Such basic dyes are exemplified by:

Diphenylmethane series:

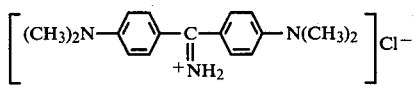

Auramine (C.I. 41000)

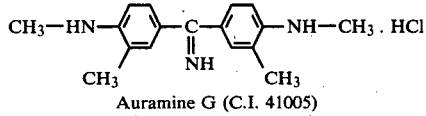

Auramine G (C.I. 41005)

Triphenylmethane series:
(1) Diamino series:

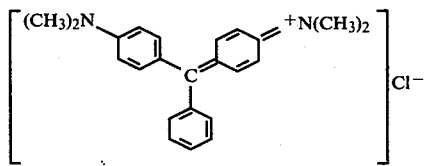

Malachite Green (C.I. 42000)

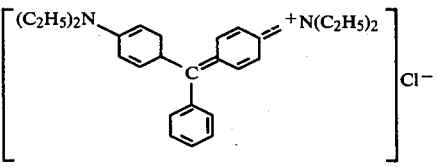

Brilliant Green (C.I. 42040)

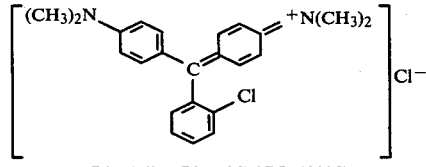

Rhoduline Blue 6G (C.I. 42025)

(2) Triamino series:

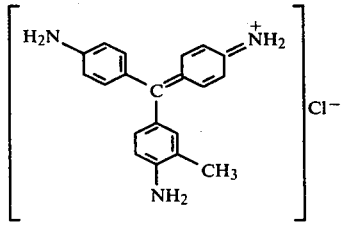

Fuchsine (C.I. 42510)

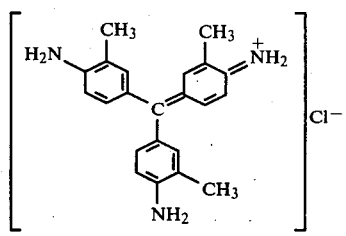

New Magenta (C.I. 42520)

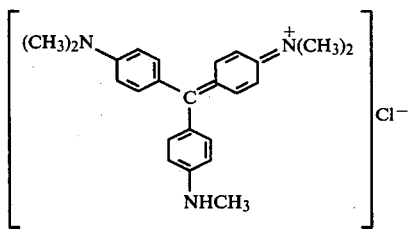

Methyl Violet (C.I. 42535)

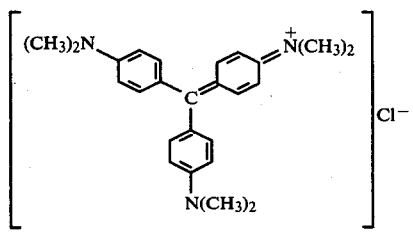

Crystal Violet (C.I. 42555)

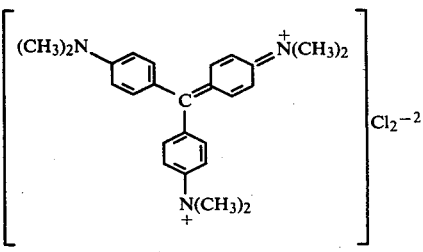

Methyl Green (C.I. 42556)

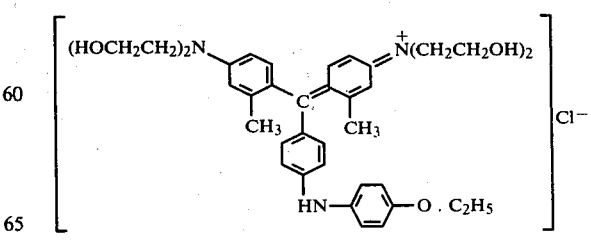

Astra Cyanine B (C.I. 42705)

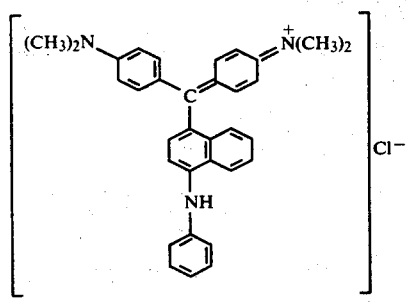
Victoria Blue B (C.I. 44045)
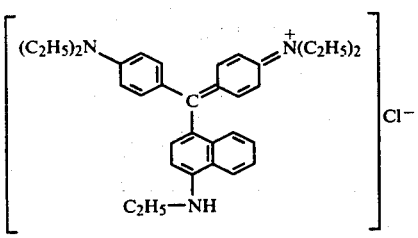
Victoria Pure Blue BO (C.I. 42595)
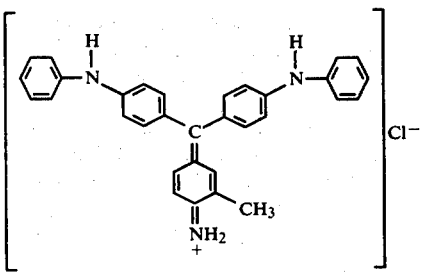
Aniline Blue (C.I. 42775)
Rhodamine series:
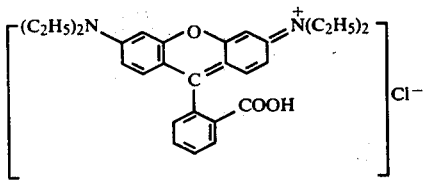
Rhodamine B (C.I. 45170)
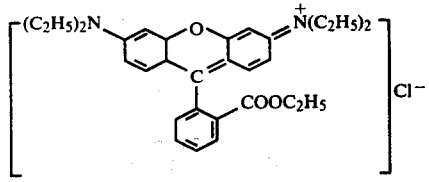
Rhodamine 3B (C.I. 45175)
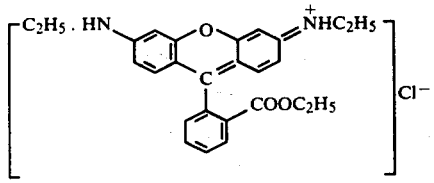
Rhodamine 6G (C.I. 45160)
Acridine series:
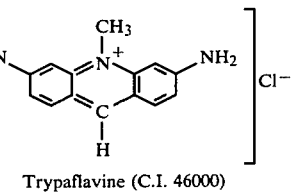
Trypaflavine (C.I. 46000)
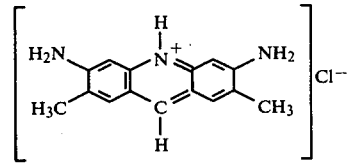
Acridine Yellow G (C.I. 46020)
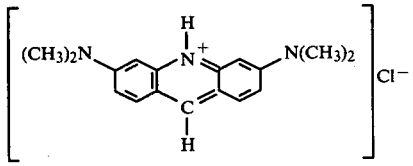
Acridine Orange NO (C.I. 46005)
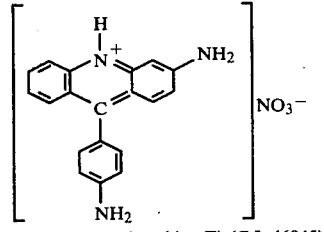
Phosphine (or Phosphine E) (C.I. 46045)
Quinoimine series:
(1) Azine series:
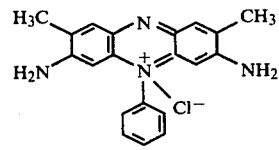
Safranine T (C.I. 50240)
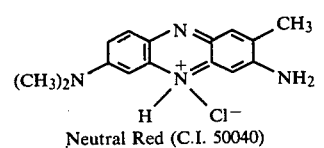
Neutral Red (C.I. 50040)
(2) Oxazine series:
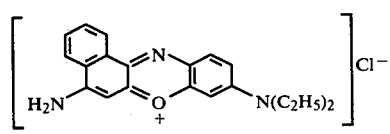
Nile Blue (C.I. 51180)
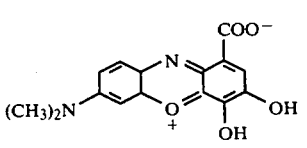
Gallocyanine (C.I. 51030)
(3) Thiazine series:

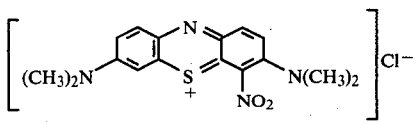

Methylene Green (C.I. 52020)

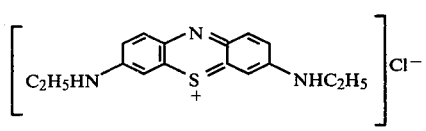

Methylene Blue (C.I. 52015)

(4) Thiazole series:

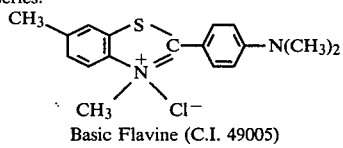

Basic Flavine (C.I. 49005)

(5) Basic azo series:

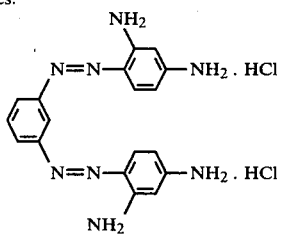

Bismarck Brown G (C.I. 21000)

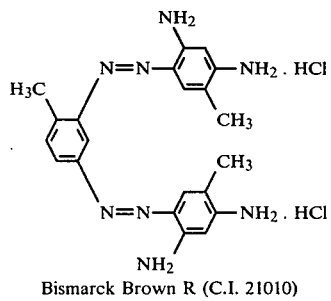

Bismarck Brown R (C.I. 21010)

A specific resistance of 1 kΩ-cm or less can be obtained by adding 0.2 part by weight or more, and preferably 0.5–6 parts by weight, more preferably 1 to 2 parts by weight, of the above-mentioned dyes to 100 parts by weight of the solvent containing at least 20% by weight of dichloromethane.

The following Table shows influence of the kind of a dye and the kind of a solvent on a specific resistance of the resulting ink.

TABLE:

| | Specific resistance of ink | | | |
|---|---|---|---|---|
| Dye<br>Solvent | None | Basic Dye (Crystal Violet, 1% wt) | Oil-Soluble dye (Sudan Blue II, 5% wt) | Organic pigment (Helogen Blue 7080, 5% wt) |
| $CH_2Cl_2$ | $>1 \times 10^8$ | $7.5 \times 10^2$ | $>1 \times 10^6$ | $>1 \times 10^6$ |
| $CH_2Cl_2$ (20% wt)<br>$CCl_3CH_3$ (80% wt) | $>1 \times 10^8$ | $9.9 \times 10^2$ | $>1 \times 10^7$ | $>1 \times 10^7$ |
| $CH_2Cl_2$ (50% wt)<br>$CCl_2=CHCl$ (50% wt) | $>1 \times 10^8$ | $8.5 \times 10^2$ | $>1 \times 10^6$ | $>1 \times 10^7$ |
| $CCl_3F$ | $>1 \times 10^8$ | $>1 \times 10^7$ | $>1 \times 10^6$ | $>1 \times 10^7$ |
| $CCl_3CH_3$ | $>1 \times 10^8$ | $>1 \times 10^6$ | $>1 \times 10^7$ | $>1 \times 10^7$ |
| $CCl_2FCF_2Cl$ | $>1 \times 10^8$ | $>1 \times 10^7$ | $>1 \times 10^7$ | $>1 \times 10^7$ |
| $CCl_2=CHCl$ | $>1 \times 10^8$ | $>1 \times 10^7$ | $>1 \times 10^7$ | $>1 \times 10^7$ |
| $CCl_2=CCl_2$ | $>1 \times 10^8$ | $>1 \times 10^7$ | $>1 \times 10^7$ | $>1 \times 10^7$ |

(Unit: Ω-cm, at 20° C.)

As is clear from the above Table, an ink having a specific resistance of 1 kΩ-cm or less can only be obtained when a basic dye is added to dichloromethane or a mixed solvent containing at least 20% by weight of dichloromethane.

The above-mentioned basic dyes are an essential component in the present invention, but are generally poor in weather proofness. This defect can be obviated by adding an oil-soluble dye or organic dye which is soluble in said solvents to the basic dyes are exemplified by:

(1) Yellow series:

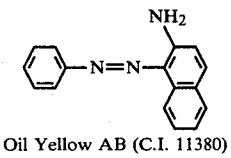

Oil Yellow AB (C.I. 11380)

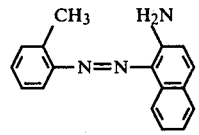

Oil Yellow OB (C.I. 11390)

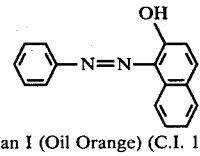

Sudan I (Oil Orange) (C.I. 12055)

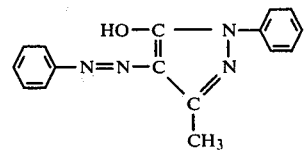

Aniline (3-methyl-1-phenyl-5-pyrazolone) (C.I. 12700)

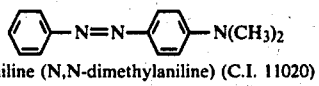
Aniline (N,N-dimethylaniline) (C.I. 11020)

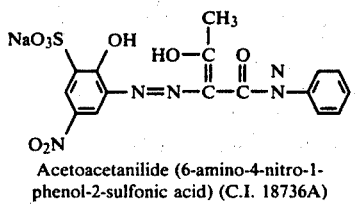
Acetoacetanilide (6-amino-4-nitro-1-phenol-2-sulfonic acid) (C.I. 18736A)

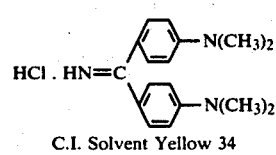
C.I. Solvent Yellow 34

(2) Red series:

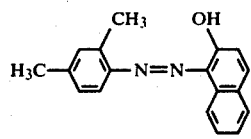
Oil Red (C.I. 12140)

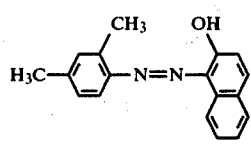
Sudan II (Oil Red XO) (C.I. 12140)

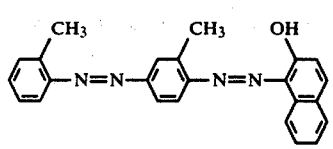
Biebrich Scarlet (Oil Red B) (C.I. 26105)

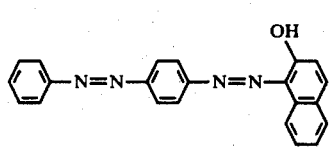
Oil Red AS (C.I. 26100)

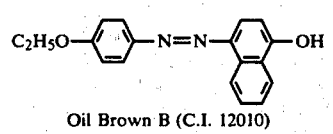
Oil Brown B (C.I. 12010)

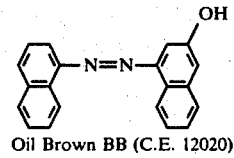
Oil Brown BB (C.E. 12020)

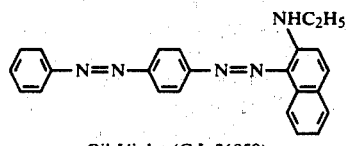
Oil Violet (C.I. 26050)

(3) Blue series:

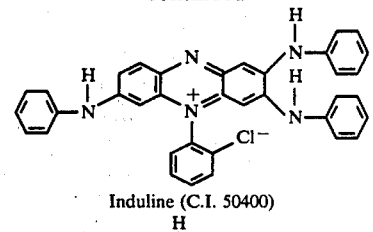
Induline (C.I. 50400)

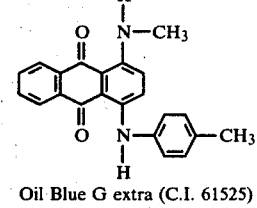
Oil Blue G extra (C.I. 61525)

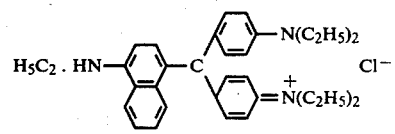
Solvent Blue 5 (C.I. 42595 B)

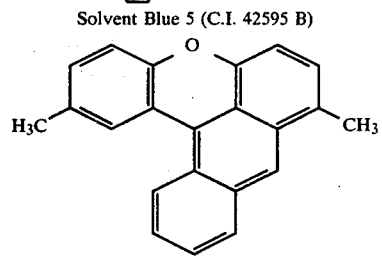
Solvent Green 4 (C.I. 45550)

Also, as the organic pigments, pigments which are soluble in the above-mentioned solvents such as Pigment Red 81

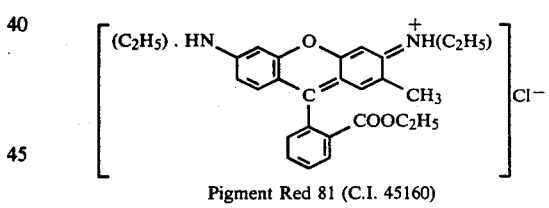
Pigment Red 81 (C.I. 45160)

or C.I. 70460 (an organic pigment of phthalocyanine series such as Heliogen Blue 7080) may be used.

The amount of the oil-soluble dyes and organic pigments used in the present invention in order to supplement the deficient weather proofness of the basic dyes may be varied within a range of 20 to 95% by weight of a basic dye and 80 to 5% by weight of an oil-soluble dye and/or an organic pigment based on the total weight of the mixed coloring agent. The lower limit for the basic dye content depends upon the specific resistance value of the ink.

The solid component or a so-called binder constituting a vehicle together with the organic solvent in the present invention is a component making a remarkable contribution to the properties of the ink, and particularly the drying property after printing, adhesive property and durability of the ink. As the solid component, various resins and rubbers which have been used in the production of printing inks and paints may be used as in prior art inks. Specifically, epoxy resins, phenol resins, xylene resins, ketone resins, alkyd resins, rosin resins, terpene resins or modified resins thereof, homopolymers and copolymers of styrene, acrylate, vinyl chloride or vinyl acetate, polyvinyl acetals, polyesters, polyamides, cellulose derivatives and rubbers such as natural rubber, polybutadiene rubbers, polysioprene rubbers, chloroprene rubbers and isobutylene-isoprene rubbers may be used. These resins and rubbers may be used alone or in a mixture of two or more thereof.

In order to keep the voscosity of the ink at 5 centipoises or less as a condition necessary to form a smooth flow of ink particles, these resins and rubbers are preferably used in an amount of up to 10 parts by weight per 100 parts by weight of the solvent. On the one hand, in order to secure the adhesion of the coloring agent, the resins and rubbers are used in an amount of 0.5 to 6 parts by weight per 100 part by weight of the organic solvent.

Further, the inks according to the present invention may contain, if desired, an ultraviolet absorber, an antioxidant, a plasticizer, etc. which are soluble in said solvents.

The following examples, in which all parts are expressed by weight unless otherwise indicated, will serve to illustrate the practice of the invention in more detail. Also, in the preparation of inks, the following coloring agents, resins, etc. manufactured by the respective companies were used.

BASIC DYES

Malachite Green: Tokyo Kasei or Sumitomo Chemical Company Limited

Methyl Violet: Tokyo Kasei (Methyl Violet) or Hodogaya Chemical Co., Ltd. (Aizen Methyl Violet pure special)

Crystal Violet: Tokyo Kasei

Aniline Blue: Tokyo Kasei

Rhodamine B: Tokyo Kasei (Rhodamine B), Sumitomo Chemical Company Limited (Rhodamine B) or Badische Anilin & Soda Fabrik A.G. (Rhodamine F4G)

Rhodamine 6G: Tokyo Kasei

Acridine Orange NO: Tokyo Kasei (Acridine Orange)

Bismarck Brown R: Tokyo Kasei

Methylene Blue: Tokyo Kasei

OIL-SOLUBLE DYES

Sudan I: Tokyo Kasei

Oil Red: Tokyo Kasei and Hodogaya Chemical Co., Ltd. (Aizen Oil Red XO)

Oil Red B: Hodogaya Chemical Co., Ltd. (Aizen Orange Red)

Oil Brown B: Sumitomo Chemical Company Limited (Oleosol Brown B)

Oil Brown BB: Badische Anilin & Soda Fabrik A.G. (Sudan Brown BB)

Induline: Badische Anilin & Soda Fabrik A.G. (Indulin N base)

Solvent Red 122: Badische Anilin & Soda Fabrik A.G. (Neozapon Red GE) (C.I. 12716)

Solvent Blue 35: Badische Anilin & Soda Fabrik A.G. (Sudan Blue II) (C.I. 61554)

Solvent Blue 70: Badische Anilin & Soda Fabrik A.G. (Neozapon Blue FFR) (C.I. 74400)

Solvent Green 4: Badische Anilin & Soda Fabrik A.G. (Fluorol 5 G)

ORGANIC PIGMENTS

Badische Anilin & Soda Fabrik A.G. (Heliogen Blue 7080 (C.I. 70460) and Fanal Blue PTM 6340 (C.I. 42595), 6390 (C.I. 42595))

RESINS AND RUBBERS

Phenol resins: Hitachi Chemical Co., Ltd. Hitanol 40G, 40P, 1501, 1502, 2501

Terpene-modified phenol resins: Sumitomo Bakelite Co., Ltd. Sumilite Resin PR220

Alkyd resins: Hitachi Chemical Co., Ltd. Phthalkyd 265, 375

Ketone resins: Hitachi Chemical Co., Ltd. Hilac 222

Xylene resins: Mitsubishi Gas-Chemical Co., Inc. Nikanol H

Polyamide resins: Hitachi Chemical Co., Ltd. Hitamide 420, 503

Rosin resins: Hercules Powder Co. Staybelite Ester

Terpene resins: Esso Standard Sekiyu K.K. Piccolyte 125

Epoxy resins: Shell Chemical Co. Epikote 828, 834, 871, 1001

Polyester resins: Toyo Spinning Co., Ltd. Bairon 300

Polyvinyl butyral: Sekisui Chemical Co., Ltd. Esulex BL-1

Chloroprene rubbers: Asahi Chemical Industry Co., Ltd. Neoprene WRT

Polybutadiene rubbers: Japanese Geon Co., Ltd. Nipol BR1220

SOLVENTS 1,1,2-Trichloro-1,2,2-trifluoroethane: Daikin Kogyo Co., Ltd. Daiflon 113

As the other solvents, commercially available reagents were used.

EXAMPLE 1

| | | Parts |
|---|---|---|
| Solvent: | Dichloromethane | 100 |
| Coloring agent: | Rhodamine B | 1 |
| Resins: | Esulex BL-1 | 4 |
| | Epikote 828 | 1 |

The above-mentioned solvent was charged into a ground stopper Erlenmeyer flask. The resins were added to the solvent with ultrasonic stirring to dissolve the resins completely. The coloring agent was then added to the resulting solution to dissolve it. Thus, an ink for an ink-jet printer was prepared.

The ink showed a specific resistance of 950 $\Omega$-cm, a viscosity of 2.5 centipoises, a specific gravity of 1.2 and a surface tension of 28.4 dyne/cm at 20° C. and was non-combustible. Further, the formation of ink particles and the examination of printing by a Hitachi DP-I type ink-jet printer were carried out by the use of said ink. Thus, satisfactory results were obtained such as smooth formation and control of particle flow, rapid drying property, distinctness of printing, etc.

Also, inflammability test were carried out according to JIS K2274 by measuring the flash point of the ink by the use of a Cleveland Open Cup and judging a flash point of 200° C. or more as flame retardant. Also, glass fiber cord of about 7 mm in diameter was impregnated enough with the ink. The impregnated cord was exposed directly to a flame to ignite it and the flame was then removed. When combustion did not last, the ink was judged as incombustible.

EXAMPLES 2–38

In the same manner as in Example 1, inks for an ink-jet printer were prepared by blending a coloring agent (II) and resins, etc. (III) with a solvent (I) in the ratio as described below.

| | Component (The heading numbers correspond to the example number.) | | Parts |
|---|---|---|---|
| 2. | (I) | Dichloromethane | 100 |
| | (II) | Malachite Green | 1.0 |
| | (III) | Hitanol 2501 | 3.5 |
| | | Phthalkyd 265 | 1.5 |
| 3. | (I) | Dichloromethane | 100 |
| | (II) | Rhodamine B | 2.0 |
| | (III) | Hitanol 40P | 6.0 |
| | | Epikote 871 | 2.0 |
| 4. | (I) | Dichloromethane | 100 |
| | (II) | Methylene Blue | 1.5 |
| | (III) | Hilac 222 | 4.0 |
| | | Phthalkyd 265 | 2.0 |
| 5. | (I) | Dichloromethane | 100 |
| | (II) | Crystal Violet | 1.0 |
| | (III) | Hitanol 40P | 4.0 |
| | | Neoprene WRT | 1.0 |
| 6. | (I) | Dichloromethane | 100 |
| | (II) | Acridine Orange | 1.5 |
| | (III) | Epikote 834 | 0.5 |
| | | Hitanol 40G | 5.5 |
| 7. | (I) | Dichloromethane | 100 |
| | (II) | Crystal Violet | 1.0 |
| | (III) | Bairon 300 | 1.0 |
| | | Hitanol 1501 | 4.0 |
| 8. | (I) | Dichloromethane | 100 |
| | (II) | Bismarck Brown R | 1.5 |
| | (III) | Nikanol H | 5.0 |
| | | Phthalkyd 265 | 1.0 |
| 9. | (I) | Dichloromethane | 100 |
| | (II) | Methyl Violet | 1.5 |
| | (III) | Piccolyte 125 | 4.0 |
| | | Phthalkyd 265 | 2.0 |
| 10. | (I) | Dichloromethane | 100 |
| | (II) | Aniline Blue | 1.5 |
| | (III) | Sumilite Resin PR 220 | 4.0 |
| | | Phthalkyd 265 | 2.0 |
| 11. | (I) | Dichloromethane | 100 |
| | (II) | Rhodamine 6 G | 1.0 |
| | (III) | Nipol BR 1220 | 3.0 |
| | | Hitanol 40G | 2.0 |
| 12. | (I) | Dichloromethane | 100 |
| | (II) | Malachite Green | 1.0 |
| | | Sudan I | 1.0 |
| | (III) | Hitanol 1502 | 4.0 |
| | | Phthalkyd 375 | 1.0 |
| 13. | (I) | Dichloromethane | 100 |
| | (II) | Crystal Violet | 1.2 |
| | | Oil Red | 1.0 |
| | (III) | Hitamide 503 | 3.5 |
| | | Hitamide 420 | 1.5 |
| 14. | (I) | Dichloromethane | 100 |
| | (II) | Rhodamine B | 1.5 |
| | | Aizen Orange Red | 1.0 |
| | (III) | Staybelite Ester | 4.0 |
| | (III) | Phthalkyd 375 | 1.0 |
| 15. | (I) | Dichloromethane | 100 |
| | (II) | Crystal Violet | 1.0 |
| | | Oleosol Brown B | 1.0 |
| | (III) | Hilac 222 | 3.5 |
| | | Phthalkyd 265 | 1.5 |
| 16. | (I) | Dichloromethane | 100 |
| | (II) | Methylene Blue | 0.5 |
| | | Malachite Green | 1.0 |
| | | Induline N base | 0.5 |
| | (III) | Hitanol 1501 | 4.0 |
| | | Neoprene WRT | 1.0 |
| 17. | (I) | Dichloromethane | 100 |
| | (II) | Bismarck Brown R | 1.5 |

-continued

| | Component (The heading numbers correspond to the example number.) | | Parts |
|---|---|---|---|
| | | Sudan Brown BB | 1.0 |
| | (III) | Epikote 1001 | 5.0 |
| | | Phtalkyd 265 | 1.0 |
| 18. | (I) | Dichloromethane | 100 |
| | (II) | Methyl Red | 1.0 |
| | | Rhodamine 6G | 1.0 |
| | | Aizen Oil Red XO | 0.5 |
| | (III) | Staybelite Ester | 4.0 |
| | | Phthalkyd 375 | 1.0 |
| 19. | (I) | Dichloromethane | 100 |
| | (II) | Malachite Green | 1.0 |
| | | Crystal Violet | 1.5 |
| | | Induline N base | 0.5 |
| | (III) | Epikote 871 | 1.0 |
| | | Hitanol 2501 | 1.0 |
| 20. | (I) | Dichloromethane | 100 |
| | (II) | Rhodamine B | 1.0 |
| | | Acridine Orange | 0.5 |
| | | Aizen Orange Red | 0.5 |
| | (III) | Bairon 300 | 3.5 |
| | | Phthalkyd 375 | 1.5 |
| 21. | (I) | Dichloromethane | 100 |
| | (II) | Crystal Violet | 1.0 |
| | | Induline N base | 0.5 |
| | (III) | Hitanol 1502 | 4.0 |
| | | Neoprene WRT | 1.0 |
| 22. | (I) | Dichloromethane | 100 |
| | (II) | Malachite Green | 1.5 |
| | | Heliogen Blue 7080 | 0.5 |
| | (III) | Epikote 1001 | 2.0 |
| | | Epikote 871 | 1.0 |
| | | Hitanol 40P | 2.0 |
| 23. | (I) | Dichloromethane | 100 |
| | (II) | Bismarck Brown R | 1.0 |
| | | Aniline Blue | 0.5 |
| | | Fluorol 5G | 0.5 |
| | | Fanal Blue PTM 6340 | 1.0 |
| | (III) | Hilac 222 | 5.0 |
| | | Phthalkyd 265 | 1.0 |
| 24. | (I) | Dichloromethane | 50 |
| | | Trichlorofluoromethane | 50 |
| | (II) | Crystal Violet | 1.5 |
| | | Sudan Blue II | 0.5 |
| | (III) | Hitanol 1502 | 4.0 |
| | | Phthalkyd 375 | 1.0 |
| 25. | (I) | Dichloromethane | 40 |
| | | 1,1,2-Trichloro-1,2,2-trifluoroethane | 60 |
| | (II) | Rhodamine B | 1.5 |
| | | Aizen Orange Red | 0.5 |
| | (III) | Epikote 828 | 0.5 |
| | | Hitanol 1501 | 4.5 |
| 26. | (I) | Dichloromethane | 40 |
| | | Dichlorobenzene | 60 |
| | (II) | Methyl Red | 2.0 |
| | (III) | Nikanol H | 4.0 |
| | | Phthalkyd 375 | 1.0 |
| 27. | (I) | Dichloromethane | 50 |
| | | Trichloroethylene | 50 |
| | (II) | Malachite Green | 1.5 |
| | | Fluorol 5G | 0.5 |
| | (III) | Piccolyte 125 | 4.0 |
| | | Phthalkyd 375 | 1.0 |
| 28. | (I) | Dichloromethane | 60 |
| | | Tetrachloroethylene | 40 |
| | (II) | Crystal Violet | 2.0 |
| | | Heligen Blue 7080 | 1.0 |
| | (III) | Hitanol 1501 | 5.0 |
| | | Phthalkyd 375 | 0.5 |
| 29. | (I) | Dichloromethane | 50 |
| | | α-Bromopropane | 50 |
| | (II) | Methyl Violet | 1.0 |
| | | Crystal Violet | 0.5 |
| | | Neozapon Blue FFR | 0.5 |
| | (III) | Bairon 300 | 6.0 |
| 30. | (I) | Dichloromethane | 40 |
| | | 1,1,2,2-Tetrachlorodifluoroethane | 60 |
| | (II) | Rhodamine F4G | 1.0 |
| | | Acridine Orange | 0.5 |

-continued

| Component (The heading numbers correspond to the example number.) | | | Parts |
|---|---|---|---|
| | | Aizen Oil Red XO | 0.5 |
| | (III) | Piccolyte 125 | 4.0 |
| | | Phthalkyd 375 | 1.0 |
| 31. | (I) | Dichloromethane | 100 |
| | (II) | Crystal Violet | 2.0 |
| | | Fanal Blue PTM 6390 | 0.5 |
| | (III) | Fpikote 1001 | 5.0 |
| | | Phthalkyd 265 | 1.0 |
| 32. | (I) | Dichloromethane | 40 |
| | | 1,1,1-Trichloroethane | 60 |
| | (II) | Malachite Green | 2.0 |
| | | Aizen Methyl Violet pure special | 0.5 |
| | (III) | Nikanol H | 4.0 |
| | | Phthalkyd 375 | 1.0 |
| 33. | (I) | Dichloromethane | 50 |
| | | 1,1,2,2-Tetrachlorodifluoroethane | 50 |
| | (II) | Crystal Violet | 1.5 |
| | | Sudan Blue II | 0.5 |
| | (III) | Hitanol 40P | 5.0 |
| | | Neoprene WRT | 0.5 |
| 34. | (I) | Dichloromethane | 30 |
| | | 1,1,2,2-Tetrachlorodifluoroethane | 70 |
| | (II) | Malachite Green | 1.5 |
| | | Heliogen Blue 7080 | 1.0 |
| | (III) | Epikote 871 | 1.0 |
| | | Hitanol 1502 | 5.0 |
| 35. | (I) | Dichloromethane | 30 |
| | | Trichloroethylene | 40 |
| | | Tetrachloroethylene | 30 |
| | (II) | Rhodamine B | 2.0 |
| | | Neozapon Red GE | 0.5 |
| | (III) | Staybelite Ester | 4.0 |
| | | Phthalkyd 375 | 1.0 |
| 36. | (I) | Dichloromethane | 100 |
| | (II) | Crystal Violet | 1.0 |
| | | Malachite Green | 1.0 |
| | | Induline N base | 0.5 |
| | (III) | Hitanol 2501 | 5.0 |
| | | Phthalkyd 265 | 1.0 |
| 37. | (I) | Dichloromethane | 50 |
| | | 1,1,2,2-Tetrachlorodifluoroethane | 50 |
| | (II) | Crystal Violet | 1.5 |
| | | Fanal Blue PTM 6340 | 0.5 |
| | (III) | Hitanol 40G | 4.0 |
| | | Epikote 828 | 2.0 |

The specific resistance, viscosity, specific gravity and surface tension of the inks obtained were as shown in the following table (measured at 20° C.).

TABLE

| Example | Specific resistance Ω-cm | Viscosity (centi-poises) | Specific viscosity | Surface tension (dyne/cm) |
|---|---|---|---|---|
| 2 | 900 | 2.0 | 1.28 | 28.5 |
| 3 | 970 | 4.3 | 1.25 | 28.6 |
| 4 | 980 | 2.8 | 1.27 | 28.1 |
| 5 | 850 | 2.5 | 1.28 | 28.1 |
| 6 | 900 | 2.0 | 1.27 | 28.0 |
| 7 | 880 | 2.1 | 1.25 | 28.5 |
| 8 | 950 | 2.3 | 1.27 | 28.4 |
| 9 | 910 | 2.5 | 1.26 | 28.1 |
| 10 | 900 | 2.1 | 1.25 | 28.5 |
| 11 | 950 | 3.1 | 1.24 | 28.7 |
| 12 | 910 | 2.2 | 1.26 | 28.1 |
| 13 | 810 | 2.0 | 1.25 | 28.6 |
| 14 | 980 | 2.7 | 1.27 | 28.3 |
| 15 | 850 | 2.1 | 1.26 | 28.5 |
| 16 | 985 | 3.1 | 1.26 | 28.4 |
| 17 | 915 | 2.5 | 1.26 | 28.2 |
| 18 | 910 | 1.9 | 1.24 | 28.1 |
| 19 | 780 | 3.2 | 1.23 | 28.2 |
| 20 | 970 | 1.9 | 1.27 | 28.4 |
| 21 | 880 | 1.9 | 1.28 | 28.2 |
| 22 | 890 | 2.3 | 1.26 | 28.2 |
| 23 | 960 | 3.0 | 1.21 | 28.8 |
| 24 | 810 | 1.7 | 1.30 | 29.0 |
| 25 | 960 | 1.9 | 1.29 | 26.6 |
| 26 | 940 | 3.2 | 1.17 | 29.7 |
| 27 | 980 | 1.8 | 1.30 | 29.1 |
| 28 | 780 | 3.2 | 1.29 | 30.7 |
| 29 | 910 | 3.0 | 1.28 | 27.1 |
| 30 | 980 | 3.4 | 1.29 | 25.8 |
| 31 | 820 | 1.9 | 1.22 | 25.7 |
| 32 | 910 | 1.8 | 1.28 | 27.2 |
| 33 | 860 | 3.0 | 1.25 | 28.1 |
| 34 | 890 | 2.8 | 1.28 | 26.3 |
| 35 | 970 | 3.1 | 1.30 | 30.1 |
| 36 | 860 | 1.9 | 1.19 | 30.2 |
| 37 | 800 | 2.0 | 1.24 | 26.2 |

When applied to and experimented in an ink-jet printer, all the inks showed good printing property, distinct printing, excellent drying property and non-combustibility. Also, when rubbed by each other, the printings did not become illegible.

The weather resistance of the printings were evaluated by exposing to light from a 100V, 400W mercury-vapor lamp (20,000 lux) and measuring the time required for the color density to decrease to one half of its initial value (half-value period). The half-value period was 100 hours in the printing of the inks of Examples 1–11, 26 and 32, and 150 hours in the printing of the inks of Examples 12–21, 24, 25, 27, 29, 30, 33, 35 and 36 using an oil-soluble dye together with a basic dye or basic dyes. In the printing of the inks of Examples 22, 23, 28, 31, 34 and 37 using an organic pigment together with a basic dye or with basic dyes and an oil-soluble dye, a decrease in the color density was hardly observed even after irradiation for 240 hours.

What is claimed is:

1. An ink for an ink-jet printer which comprises
   (a) 100 parts by weight of dichloromethane as an organic solvent, and
   (b) 0.2 part by weight or more of a basic dye as a coloring agent,
   said ink having a specific resistance of 1 kΩ-cm or less, whereby said ink is adapted for use in an ink-jet printer.

2. An ink for an ink-jet printer which comprises
   (a) 100 parts by weight of dichloromethane as an organic solvent, p1 (b) 0.2 part by weight or more of a basic dye as a coloring agent, and
   (c) 10 parts by weight or less but a sufficient amount for securing the adhesion of the coloring agent to the surface to be printed of a solid component selected from the group consisting of resins and rubbers,
   said ink having a specific resistance of 1 kΩ-cm or less, whereby said ink is adapted for use in an ink-jet printer.

3. An ink for an ink-jet printer which comprises
   (a) a total of 100 parts by weight of dichloromethane and at least one member selected from the group consisting of halogenated lower alkanes except for dichloromethane and halogenated lower alkenes, the proportion of dichloromethane in the mixed solvent being 20% by weight or more, as an organic solvent, and
   (b) 0.2 part by weight or more of a basic dye as a coloring agent, said ink having a specific resistance of 1 kΩ-cm or less, whereby said ink is adapted for use in an ink-jet printer.

4. An ink for an ink-jet printer which comprises
(a) 100 parts by weight of dichloromethane and at least one member selected from the group consisting of halogenated lower alkanes except for dichloromethane and halogenated lower alkenes, the proportion of dichloromethane in the mixed solvent being 20% by weight or more, as an organic solvent,
(b) 0.2 part by weight or more of a basic dye as a coloring agent, and
(c) 10 parts by weight or less but a sufficient amount for securing the adhesion of the coloring agent to the surface to be printed of a solid component selected from the group consisting of resins and rubbers,
said ink having a specific resistance of 1 kΩ-cm or less, whereby said ink is adapted for use in an ink-jet printer.

5. An ink according to claim 3 or 4, wherein the proportion of dichloromethane in the mixed solvent being 30-60% by weight.

6. An ink according to claim 1 or 2, wherein the basic dye is used in an amount of 0.5-6 parts by weight per 100 parts by weight of the organic solvent.

7. An ink according to claim 6, wherein the basic dye is used in an amount of 1-2 parts by weight per 100 parts by weight of the organic solvent.

8. An ink according to claim 3 or 4, wherein the halogenated lower alkanes except for dichloromethane and the halogenated lower alkenes are trichlorofluoromethane, 1,1,1-trichloroethane, 1,1,2-trichloro-1,2,2-trifluoroethane, 1,1,2,2-tetrachloro-1,2-difluoroethane, trichloethylene, tetrachloroethylene and α-bromopropane.

9. An ink according to claim 1 or 2, wherein the basic dye is Rhodamine B (C.I. 45170), Malachite Green (C.I. 42000), Methylene Blue (C.I. 52015), Crystal Violet (C.I. 42555), Acridine Orange (C.I. 46005), Bismarck Brown R (C.I. 21010), Methyl Violet (C.I. 42535), Aniline Blue (C.I. 42775), Aizen Methyl Violet pure special (C.I. 42535) or Rhodamine 6G (C.I. 45160).

10. An ink for an ink-jet printer which comprises
(a) 100 parts by weight of dichloromethane as an organic solvent, and
(b) a total of 0.2 part by weight or more of a basic dye and at least one member selected from the group consisting of oil-soluble dyes and organic pigments, the proportion of the basic dye in the mixture being 20-95% by weight, as a coloring agent,
said ink having a specific resistance of 1 kΩ-cm or less, whereby said ink is adapted for use in an ink-jet printer.

11. An ink for an ink-jet printer which comprises
(a) 100 parts by weight of dichloromethane as an organic solvent,
(b) a total of 0.2 part by weight or more of a basic dye and at least one member selected from the group consisting of oil-soluble dyes and organic pigments, the proportion of the basic dye in the mixture being 20-95% by weight, as a coloring agent, and
(c) 10 parts by weight or less but a sufficient amount for securing the adhesion of the coloring agent to the surface to be printed of a solid component selected from the group consisting of resins and rubbers,
said ink having a specific resistance of 1 kΩ-cm or less, whereby said ink is adapted for use in an ink-jet printer.

12. An ink according to claim 10 or 11, wherein the oil-soluble dye is Sudan I (C.I. 12055), oil Red (C.I. 12140), Biebrich Scarlet (C.I. 26105), Oil Brown B (C.I. 12010), Induline (C.I. 50400), Oil Brown BB (C.I. 12020), Solvent Green 4 (C.I. 45550), Solvent Blue 35 (C.I. 61554), Solvent Blue 70 (C.I. 74400), or Solvent Red 122 (C.I. 12716).

13. An ink according to claim 10 or 11, wherein the organic pigment is Heliogen Blue 7080 (C.I. 70460), Fanal Blue PTM 6340 (C.I. 42595), or Fanal Blue PTM 6390 (C.I. 42595).

14. An ink according to claim 2, wherein the solid component is used in an amount of 0.5 to 6 parts by weight per 100 parts by weight of the organic solvent.

15. An ink according to claim 2, wherein the resins and rubbers are selected from the group consisting of epoxy resins, phenol resins, xylene resins, ketone resins, alkyd resins, rosin resins, terpene resins, or modified resins thereof, homopolymers and copolymers of styrene, acrylate, vinyl chloride and vinyl acetate, polyvinyl acetals, polyesters, polyamides, cellulose derivatives, natural rubber, polybutadiene rubbers, polyisoprene rubbers, chloroprene rubbers and isobutylene-isoprene rubbers, and mixtures of at least two thereof.

16. An ink for an ink-jet printer which comprises
(a) a total of 100 parts by weight of dichloromethane and at least one member selected from the group consisting of halogenated lower alkanes except for dichloromethane and halogenated lower alkenes, the proportion of dichloromethane in the mixed solvent being 20% by weight or more, as an organic solvent, and
(b) a total of 0.2 part by weight or more of a basic dye and at least one member selected from the group consisting of oil-soluble dyes and organic pigments, the proportion of the basic dye in the mixture being 20-95% by weight, as a coloring agent,
said ink having a specific resistance of 1 kΩ-cm or less, whereby said ink is adapted for use in an ink-jet printer.

17. An ink for an ink-jet printer which comprises
(a) a total of 100 parts by weight of dichloromethane and at least one member selected from the group consisting of halogenated lower alkanes except for dichloromethane and halogenated lower alkenes, the proportion of dichloromethane in the mixed solvent being 20% by weight or more, as an organic solvent,
(b) a total of 0.2 parts by weight or more of a basic dye and at least one member selected from the group consisting of oil-soluble dyes and organic pigments, the proportion of the basic dye in the mixture being 20-95% by weight, as a coloring agent, and
(c) 10 parts by weight or less but a sufficient amount for securing the adhesion of the coloring agent to the surface to be printed of a solid component selected from the group consisting of resins and rubbers,
said ink having a specific resistance of 1 kΩ-cm or less, whereby said ink is adapted for use in an ink-jet printer.

18. An ink according to claim 1, 2, 3, 4, 10, 11, 16 or 17, wherein the ink has a viscosity of 5 centipoises or less at room temperature.

19. An ink according to claim 18, wherein the ink has a surface tension of 25 dyne/cm or more.

20. In a method for printing a substrate with an ink jetted in a continuous flow of fine particles from an orifice by the action of a vibrator operated magnetically or electrically, said flow of particles being controlled by a video signal from an electronic character generator and an electrostatic deflection system, the improvement which comprises employing an ink which is anhydrous and comprises dichloromethane as an organic solvent, and a basic dye in an amount of at least 0.2 part by weight per 100 parts by weight of the organic solvent as a coloring agent, said ink having a specific resistance of 1 kΩ-cm or less, a viscosity of 5 centipoises or less at room temperature, and a surface tension of 25 dyne/cm or more.

21. In a method for printing a substrate with an ink jetted in a continuous flow of fine particles from an orifice by the action of a vibrator operated magnetically or electrically, said flow of particles being controlled by a video signal from an electronic character generator and an electrostatic deflection system, the improvement which comprises employing an ink which is anhydrous and comprises dichloromethane and at least one member selected from the group consisting of halogenated lower alkanes except for dichloromethane and halogenated lower alkenes, the proportion of dichloromethane in the mixed solvent being 20% by weight or more, as an organic solvent, and a basic dye in an amount of at least 0.2 part by weight per 100 parts by weight of the organic solvent as a coloring agent, said ink having a specific resistance of 1 kΩ-cm or less, a viscosity of 5 centipoises or less at room temperature, and a surface tension of 25 dyne/cm or more.

22. In a method for printing a substrate with an ink jetted in a continuous flow of fine particles from an orifice by the action of a vibrator operated magnetically or electrically, said flow of particles being controlled by a video signal from an electronic character generator and an electrostatic deflection system, the improvement which comprises employing an ink which is anhydrous and comprises dichloromethane as an organic solvent; and a basic dye and at least one member selected from the group consisting of oil-soluble dyes and organic pigments, the proportion of basic dye in the mixture being 20-95% by weight, in a total amount of at least 0.2 part by weight per 100 parts by weight of the organic solvent, as a coloring agent, said ink having a specific resistance of 1 kΩ-cm or less, a viscosity of 5 centipoises or less at room temperature, and a surface tension of 35 dyne/cm or more.

23. A method according to claim 14, 21 or 22 wherein the ink further comprises a solid component selected from the group consisting of resins and rubbers in an amount of 10 parts by weight or less per 100 parts by weight of the organic solvent but a sufficient amount for securing the adhesion of the coloring agent to the surface to be printed.

* * * * *